(12) United States Patent
Singh et al.

(10) Patent No.: US 10,145,164 B2
(45) Date of Patent: Dec. 4, 2018

(54) VEHICLE TAILGATE ASSEMBLY

(71) Applicant: Ford Global Technologies, LLC, Dearborn, MI (US)

(72) Inventors: Arjun Singh, Detroit, MI (US); Bhupenda A. Patel, Canton, MI (US); Leszek Derbis, Auburn Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 74 days.

(21) Appl. No.: 15/335,531

(22) Filed: Oct. 27, 2016

(65) Prior Publication Data

US 2018/0119474 A1    May 3, 2018

(51) Int. Cl.
| | | |
|---|---|---|
| *E05F 15/53* | (2015.01) | |
| *E05F 15/60* | (2015.01) | |
| *B62D 33/027* | (2006.01) | |
| *B62D 33/03* | (2006.01) | |
| *B62D 33/037* | (2006.01) | |
| *E05F 5/00* | (2017.01) | |
| *E05D 7/081* | (2006.01) | |

(52) U.S. Cl.
CPC .......... *E05F 15/53* (2015.01); *B62D 33/0273* (2013.01); *B62D 33/03* (2013.01); *B62D 33/037* (2013.01); *E05D 7/081* (2013.01); *E05F 5/00* (2013.01); *E05F 15/60* (2015.01); *E05Y 2201/256* (2013.01); *E05Y 2201/266* (2013.01); *E05Y 2201/654* (2013.01); *E05Y 2400/36* (2013.01); *E05Y 2400/40* (2013.01); *E05Y 2800/67* (2013.01); *E05Y 2900/546* (2013.01)

(58) Field of Classification Search
CPC ...... E05F 15/53; E05F 15/60; B62D 33/0273; B62D 33/03; B62D 33/037
USPC ....................................................... 296/57.1
See application file for complete search history.

(56) References Cited

U.S. PATENT DOCUMENTS

| | | |
|---|---|---|
| 3,952,365 A | 4/1976 | Grisebach |
| 4,672,715 A | 6/1987 | Beckwith |
| 4,768,630 A | 9/1988 | Aubry et al. |
| 4,953,259 A | 9/1990 | Frye et al. |
| 5,084,939 A | 2/1992 | Garman |
| 5,109,571 A | 5/1992 | Ohshima et al. |
| 5,207,620 A | 5/1993 | Yamamoto et al. |
| 5,358,301 A | 10/1994 | Konchan et al. |

(Continued)

FOREIGN PATENT DOCUMENTS

| | | |
|---|---|---|
| CA | 2302847 | 10/2000 |
| DE | 29808910 U1 | 5/1998 |

(Continued)

OTHER PUBLICATIONS

International Preliminary Report on Patentability in related application PCT/IB2008/054184 dated Mar. 31, 2011.

*Primary Examiner* — Joseph D. Pape
(74) *Attorney, Agent, or Firm* — Jason Rogers; Price Heneveld LLP (57) ABSTRACT

A vehicle tailgate assembly includes a tailgate adapted to pivotally latch to a vehicle cargo box. A hinge pivot is coupled to the tailgate and includes an electromagnetic cylinder and a vane hub positioned within the cylinder and coupled to at least one of the tailgate and the cargo box. The vane hub is configured to rotate within the cylinder. A vane is coupled to the vane hub. A magnetorheological fluid is positioned around the vane.

18 Claims, 5 Drawing Sheets

(56) References Cited

U.S. PATENT DOCUMENTS

| | | |
|---|---|---|
| 5,497,863 A | 3/1996 | Schmidt et al. |
| 5,635,655 A | 6/1997 | Yamashita |
| 5,720,370 A | 2/1998 | Takahashi |
| 5,743,575 A | 4/1998 | McFarland |
| 5,887,930 A | 3/1999 | Klein |
| 5,979,592 A | 11/1999 | Delgado |
| 6,085,384 A | 7/2000 | Bivens |
| 6,158,088 A | 12/2000 | Bulboaca |
| 6,314,612 B1 | 11/2001 | Rennecke et al. |
| 6,769,729 B1 | 8/2004 | Bruford et al. |
| 6,773,047 B2 | 8/2004 | Gruber |
| 6,793,263 B1 | 9/2004 | Bruford et al. |
| 6,796,592 B1 | 9/2004 | Austin |
| 6,840,353 B2 | 1/2005 | Arisaka |
| 6,840,355 B2 | 1/2005 | Iwashita |
| 6,840,356 B2 | 1/2005 | Nishiyama |
| 6,846,030 B2 | 1/2005 | Koehler et al. |
| 6,866,588 B2 | 3/2005 | Doornbos |
| 6,874,837 B2 | 4/2005 | Bruford et al. |
| 6,904,642 B2 | 6/2005 | West |
| 6,905,156 B2 | 6/2005 | Miller et al. |
| 6,976,290 B2 | 12/2005 | Boyer et al. |
| 7,032,985 B1 | 4/2006 | Ichioka et al. |
| 7,051,618 B2 | 5/2006 | Anton |
| 7,065,829 B2 | 6/2006 | Okabayashi et al. |
| 7,065,834 B2 | 6/2006 | Lowry |
| 7,066,308 B2 | 6/2006 | Kanno et al. |
| 7,156,441 B2 | 1/2007 | Austin |
| 7,195,300 B2 | 3/2007 | Austin |
| 7,213,857 B2 | 5/2007 | Austin |
| 7,213,858 B2 | 5/2007 | Smith |
| 7,243,398 B2 | 7/2007 | Salice |
| 7,281,746 B2 | 10/2007 | Austin |
| 7,281,747 B2 | 10/2007 | Austin |
| 7,287,799 B2 | 10/2007 | Austin |
| 7,296,664 B2 | 11/2007 | Ohta et al. |
| 7,334,293 B2 | 2/2008 | Erickson et al. |
| 7,353,923 B2 | 4/2008 | Seto et al. |
| 7,357,230 B2 | 4/2008 | Kojima et al. |
| 7,424,939 B2 | 9/2008 | Hayashi et al. |
| 7,484,784 B2 | 2/2009 | Ohly |
| 7,500,706 B2 | 3/2009 | Anderson et al. |
| 7,533,920 B2 | 5/2009 | Ohly |
| 7,549,193 B2 | 6/2009 | Lee et al. |
| 7,556,305 B2 | 7/2009 | Stratten |
| 7,575,109 B2 | 8/2009 | Kanno et al. |
| 7,673,929 B2 | 3/2010 | Patzer et al. |
| 7,695,043 B2 | 4/2010 | Zagoroff |
| 7,699,378 B2 | 4/2010 | Smith et al. |
| RE41,560 E | 8/2010 | Miller et al. |
| 8,020,918 B2 | 9/2011 | Patzer et al. |
| 8,424,656 B2 | 4/2013 | Hiemenz et al. |
| 9,879,454 B2 * | 1/2018 | Bendel .................. E05C 17/003 |
| 2001/0007163 A1 | 7/2001 | Alonso |
| 2002/0078529 A1 | 6/2002 | Schwarz |
| 2004/0103746 A1 | 6/2004 | Anton |
| 2005/0193523 A1 | 9/2005 | Nam et al. |
| 2006/0249343 A1 | 11/2006 | Prottengeier et al. |
| 2006/0272129 A1 | 12/2006 | Rude et al. |
| 2006/0273621 A1 | 12/2006 | Shaw et al. |
| 2007/0096492 A1 | 5/2007 | Austin |
| 2007/0145761 A1 | 6/2007 | Eschebach |
| 2007/0152471 A1 | 7/2007 | Zagoroff |
| 2007/0193840 A1 | 8/2007 | Kanno et al. |
| 2008/0197651 A1 | 8/2008 | Stratten |
| 2008/0253893 A1 | 10/2008 | Nishiyama |
| 2008/0284193 A1 | 11/2008 | Gleason |
| 2009/0096246 A1 | 4/2009 | Patzer et al. |
| 2009/0139057 A1 | 6/2009 | Honda et al. |
| 2010/0084885 A1 * | 4/2010 | Townson .............. E05D 11/084 296/57.1 |
| 2012/0272480 A1 | 11/2012 | Ac |

FOREIGN PATENT DOCUMENTS

| | | |
|---|---|---|
| DE | 202004003546 U1 | 3/2004 |
| DE | 102006008525 A1 | 2/2006 |
| EP | 978615 | 7/1999 |
| EP | 1518990 A2 | 3/2005 |
| EP | 1650468 | 4/2006 |
| EP | 1413794 | 2/2007 |
| JP | 3139427 | 6/1991 |
| JP | 2005264616 A | 9/2005 |
| JP | 2008008418 | 1/2006 |
| JP | 200677897 | 3/2006 |
| JP | 2006064122 | 3/2006 |
| JP | 2007113760 A | 5/2007 |
| KR | 20030042922 A | 6/2003 |
| KR | 100424889 B1 | 3/2004 |
| WO | 2007029441 | 3/2008 |
| WO | 2012065591 A2 | 5/2012 |

* cited by examiner

VEHICLE TAILGATE ASSEMBLY

FIELD OF THE INVENTION

The present invention generally relates to vehicle tailgate assemblies, and more particularly relates to a tailgate having a hinge pivot.

BACKGROUND OF THE INVENTION

Automotive vehicles, such as pickup trucks, are commonly employed with a cargo box or bed that may be used to transport various items. The vehicle cargo box typically has a tailgate which generally extends between the rear lateral walls and pivots about a hinge assembly near a lower edge of the tailgate between a closed position and an open position. In the open position, cargo may be easily loaded into and unloaded from the cargo box and the tailgate may be pivoted to the closed position to retain the cargo within the cargo box. It is desirable to ease the transition between the closed and open positions.

SUMMARY OF THE INVENTION

According to one aspect of the present invention, a vehicle tailgate assembly includes a tailgate adapted to pivotally latch to a vehicle cargo box. A hinge pivot is coupled to the tailgate and includes an electromagnetic cylinder and a vane hub positioned within the cylinder and coupled to at least one of the tailgate and the cargo box. The vane hub is configured to rotate within the cylinder. A vane is coupled to the vane hub. A magnetorheological fluid is positioned around the vane.

According to another aspect of the present invention, a vehicle tailgate assembly includes a tailgate adapted to pivotally latch to a vehicle cargo box. A hinge pivot is coupled to the tailgate and includes an electromagnetic cylinder, a vane hub positioned within the cylinder, and a plurality of vanes coupled to the vane hub, a magnetorheological fluid positioned around the vanes. A sensor is positioned proximate the cylinder and configured to detect motion of the vanes relative to the cylinder.

According to another aspect of the present invention, a vehicle tailgate assembly includes a tailgate coupled to a vehicle cargo box. A hinge pivot is coupled to the tailgate and includes an electromagnetic cylinder, a vane configured to rotate relative to the cylinder and a magnetorheological fluid positioned within the cylinder. A sensor is positioned proximate the cylinder and configured to detect motion of the vane and energize the electromagnetic cylinder to generate a magnetic field within the magnetorheological fluid when vane motion is detected.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Referring now to FIGS. 1-7, reference numeral 10 generally designates a vehicle 10 including a vehicle tailgate assembly 14. The tailgate assembly 14 includes a tailgate 22 adapted to pivotally latch to a vehicle cargo box 26. A hinge pivot 30 is coupled to the tailgate 22. The hinge pivot 30 includes a cylinder 34 and a vane hub 38 positioned within the cylinder 34. The vane hub 38 is configured to rotate relative to the cylinder 34. A vane 42 is coupled to the vane hub 38. A fluid 46 is positioned around the vane 42. A sensor 50 may be positioned proximate the hinge pivot 30 and configured to detect motion of the vane 42 and/or vane hub 38 within the cylinder 34. The tailgate 22 of the tailgate assembly 14 is operable between closed and open positions.

Referring now to FIGS. 1-5, the vehicle 10 is depicted in the form of a pickup truck and shown having a cargo box 26 or bed and equipped with the tailgate assembly 14 defining a rear wall of the cargo box 26, according to one embodiment. The cargo box 26 generally has a bottom floor 64, and lateral side walls 68 and 72, and a front wall. The tailgate assembly 14 pivots between an upright, vertical closed position to serve as the rear wall of the cargo box 26 and a downward, open position generally shown horizontal in FIG. 2.

The tailgate assembly 14 includes an interior surface 80 that forms the rear wall of the cargo box 26, according to some examples. An outer surface 84 of the tailgate assembly 14 faces vehicle rearward when the tailgate 22 is in the closed position. First and second lateral surfaces 88, 92 couple the interior and outer surfaces 80, 84 to one another. The interior surface 80, outer surface 84, and first and second lateral surfaces 88, 92 define a cavity therebetween.

The tailgate assembly 14 further includes latch mechanisms 100 located on opposite sides near the top edge configured to engage and latch onto strikers 104 on the cargo box 26, such as a D-pillar, to retain the tailgate assembly 14 latched in the closed position. The latch mechanism 100 of the tailgate assembly 14 may employ conventional latching assemblies. The latch mechanism 100 may be controlled to open in response to actuation of a switch 108, which is shown built into a tailgate release latch handle 112. In one example, the switch 108 may be actuated by a user to unlatch latch mechanism 100 to open the tailgate assembly 14. In at least one example, the latch mechanism 100 may be electronically actuated to the unlatched position in response to actuation of the switch 108. However, it will be understood that the switch 108 and latch mechanism 100 may be otherwise configured such as a mechanical user-actuated device.

The tailgate assembly 14 may include a pair of support cables 120 connected at each end to the vehicle body structure such as the D-pillars to support the tailgate assembly 14 and any load applied thereto when in the horizontal open position. While the tailgate assembly 14 is in the open position, cargo stored within the box 60 may extend outwardly of a rear end of the cargo box 26 and/or above interior surface 80 of the tailgate 22.

The tailgate assembly 14 extends between the lateral walls 68, 72. A pair of the hinge pivots 30 couple the first and second lateral surfaces 88, 92 of the tailgate assembly 14 near a bottom edge to the lateral walls 68, 72. The hinge pivots 30 allow the tailgate assembly 14 to pivot between the closed and open positions about a bottom edge relative to a supporting vehicle structure, such as the D-pillars. The hinge pivots 30 may be keyed to allow removal of the tailgate assembly 14 from the vehicle 10. The cylinders 34 of the hinge pivots 30 may be fixedly coupled to the supporting vehicle structure and the vane hub 38 may be fixedly coupled to the lateral walls 68, 72 such that pivotal motion of the tailgate 22 between the closed and open positions rotates the vane hub 38 relative to the cylinder 34. It will be understood that the positioning and coupling of the cylinders 34 and vane hub 38 may be reversed (i.e., the vane hub 38 is coupled with the tailgate 22 and the cylinders 34 are coupled to the cargo box 60).

According to various examples, the cylinder 34 may be electromagnetic in nature. In such examples, the electromagnetic cylinder 34 may be an electromagnet. In electromagnet examples, the cylinder 34 may produce a magnetic field by having electrical energy (e.g., an electric current) applied (e.g., provided) thereto. The magnetic field may disappear when the electrical energy is turned off. The intensity of the magnetic field may be varied by varying the amount of electrical current supplied to the cylinder 34. The magnetic field generated by the electromagnetic cylinder 34 may permeate the fluid 46. In electromagnet examples of the cylinder 34, the cylinder 34 may include a large number of closely spaced turns of wire that create the magnetic field. The cylinder 34 may be electrically coupled to a power source 128 to provide the electrical energy.

Positioned within the cylinder 34 are the vane hub 38 and the vane 42. According to various examples, the vane hub 38 may include a plurality of vanes 42 coupled thereto. The vanes 42 may be attached or integrally defined by the vane hub 38. The vanes 42 may extend radially outward from the vane hub 38 toward the cylinder 34. Although depicted as extending radially outward from the vane hub 38, the vanes 42 may additionally or alternately be angled relative to the vane hub 38. Further, each vane 42 may define one or more passageways through the vane 42 for the fluid 46 to move. The vane hub 38 and/or the vanes 42 may be formed of a polymeric, metallic (magnetic and/or non-magnetic) and/or ceramic material. As explained above, the vane hub 38 is coupled to the lateral walls 68, 72 such that pivotal motion of the tailgate 22 between the closed and open positions results in motion (e.g., rotation) of the vane hub 38 relative to the cylinder 34. The cylinder 34 may be coupled to a bracket 116 of the tailgate 22. Relative motion of the cylinder 34 to the vane hub 38 causes rotation of the vanes 42 through the fluid 46. As will be explained in greater detail below, the sensor 50 is configured to detect motion of the vanes 42 and/or vane hub 38 within the cylinder 34. Such movement may indicate motion of the tailgate 22 between the open and closed positions and/or wobbling of the tailgate 22 (e.g., up and down motion of the tailgate 22 while the tailgate 22 is in the open position due to motion of the vehicle 10). One or more of the vanes 42 may include a locator (e.g., a magnetic portion, a radio frequency identification tag, etc.) configured to be detected by the sensor 50 such that the direction of rotation of the vanes 42 may be detected by the sensor 50.

According to various examples, the fluid 46 may be configured to change viscosity in response to one or more stimuli. In such examples, the fluid 46 may include one or more "smart fluids" in a carrier fluid. The carrier fluid may be a type of oil. When subjected to a stimuli (e.g., a magnetic field, electric field and/or electrical potential or current) the smart fluid greatly increases its apparent viscosity, to the point of becoming a viscoelastic solid. The viscosity of the smart fluid, and therefore the fluid 46, may be controlled by varying the intensity of the magnetic field. In one example, the fluid 46 may be a magnetorheological fluid configured to change viscosity in response to the magnetic field generated by the cylinder 34. Additionally or alternatively, the smart fluid of the fluid 46 may be a ferro fluid. In both magnetorheological and ferro fluid examples of the fluid 46, particles of the smart fluid may be magnetic and configured to align under the presence of the magnetic field. Such alignment of the particles may be a contributing factor to the increase in viscosity of the fluid 46. It will be understood that in other examples, the fluid 46 may include one or more non-Newtonian fluids configured to increase in viscosity in response to stress. Changing of the viscosity of the fluid 46 is configured to resist the motion of the vanes 42 through the fluid 46. By resisting the motion of the vanes 42 through the fluid 46, the speed at which the tailgate 22 moves between the closed and open positions may be lowered.

According to one example, the sensor 50 is positioned proximate the cylinder 34. Additionally or alternatively, the sensor 50 may be positioned within or touching the cylinder 34. As explained above, the sensor 50 is configured to detect motion of the vane hub 38 and/or the vanes 42 relative to the cylinder 34. The sensor 50 may be a magnetic sensor, an electric field sensor, a radio field identification tag sensor, an ultrasonic sensor and/or other types of sensors able to detect motion of the vane hub 38 and/or the vanes 42. Additionally or alternatively, the sensor 50 may be configured to detect motion of the tailgate 22. As explained above, the vanes 42 and/or the vane hub 38 may include a locator configured to be detected by the sensor 50. The sensor 50 may be configured to detect the movement of the locator. Further, the sensor 50 may be configured to detect a characteristic signal shift from the locator and/or vanes 42 such that the direction of motion (e.g., rotation) of the vane hub 38 and the vanes 42 may be determined. It will be understood that by determining the direction of motion of the vane hub 38 and the vanes 42, it can be determined whether the tailgate 22 is going from the closed to the open position, or from the open position to the closed position. Further, it will be understood that the direction of motion of the vane hub 38 and the vanes 42 may be determined by the sensor 50 without the locator. In yet another example, the sensor 50 may not be configured to detect the motion of the vanes 42, but rather detect the motion of the tailgate 22 though any of the above disclosed methods.

Figure 1:
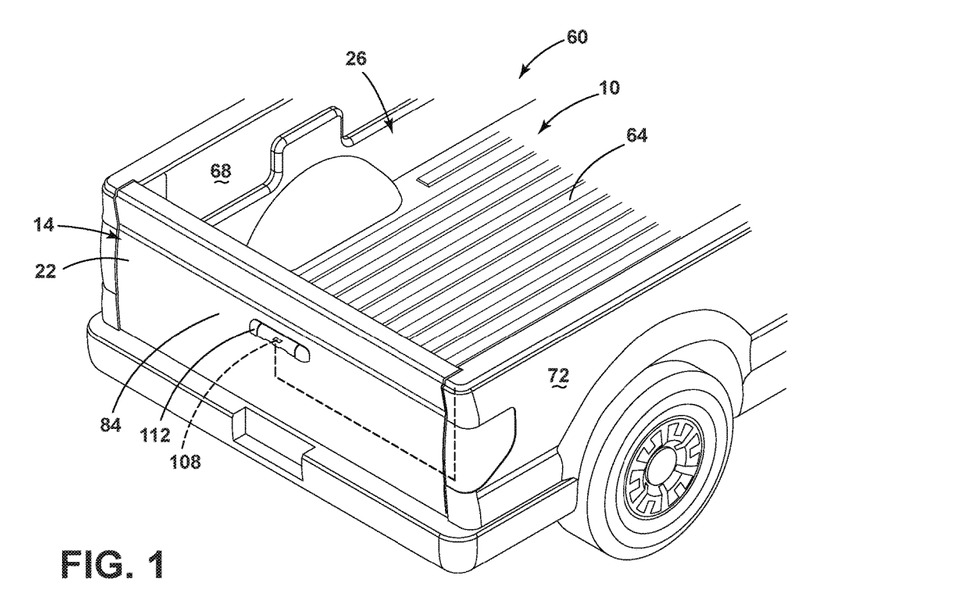
FIG. 1 is a rear side perspective view of a pickup truck cargo box having a tailgate assembly, according to one embodiment.
Figure 2:
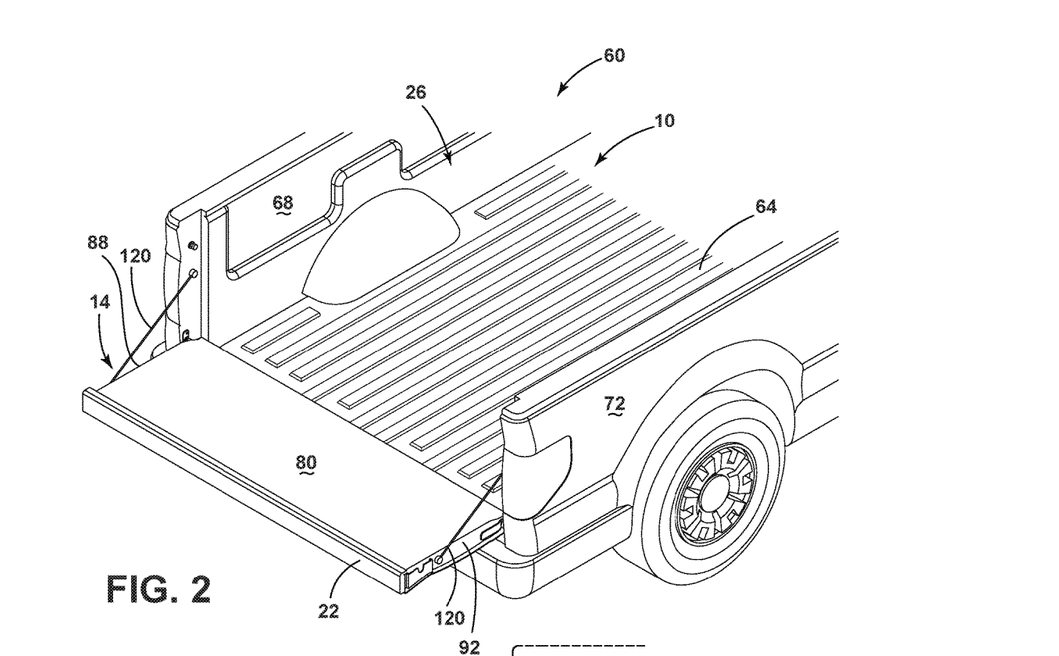
FIG. 2 is a rear side perspective view of the pickup truck cargo box with the tailgate assembly in a horizontal, open position, according to one embodiment.
Figure 3:
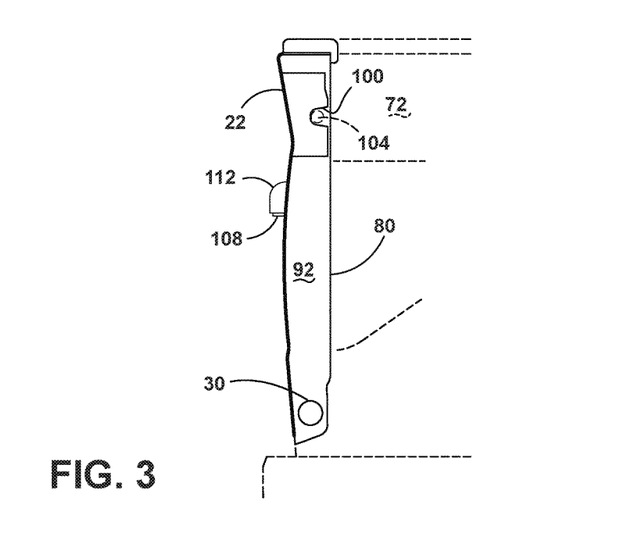
FIG. 3 is a side view of the tailgate assembly shown in FIG. 1 with the tailgate in the closed position.
Figure 4:
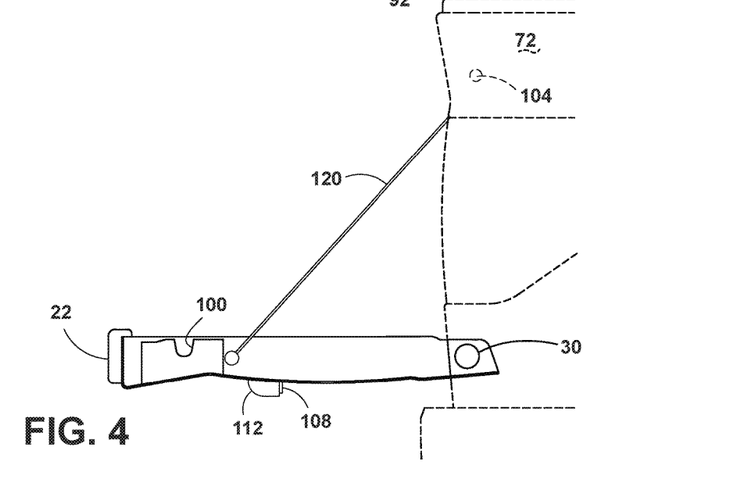
FIG. 4 is a side view of the tailgate assembly shown in FIG. 3 with the tailgate assembly in the open position, according to one embodiment.
Figure 5:
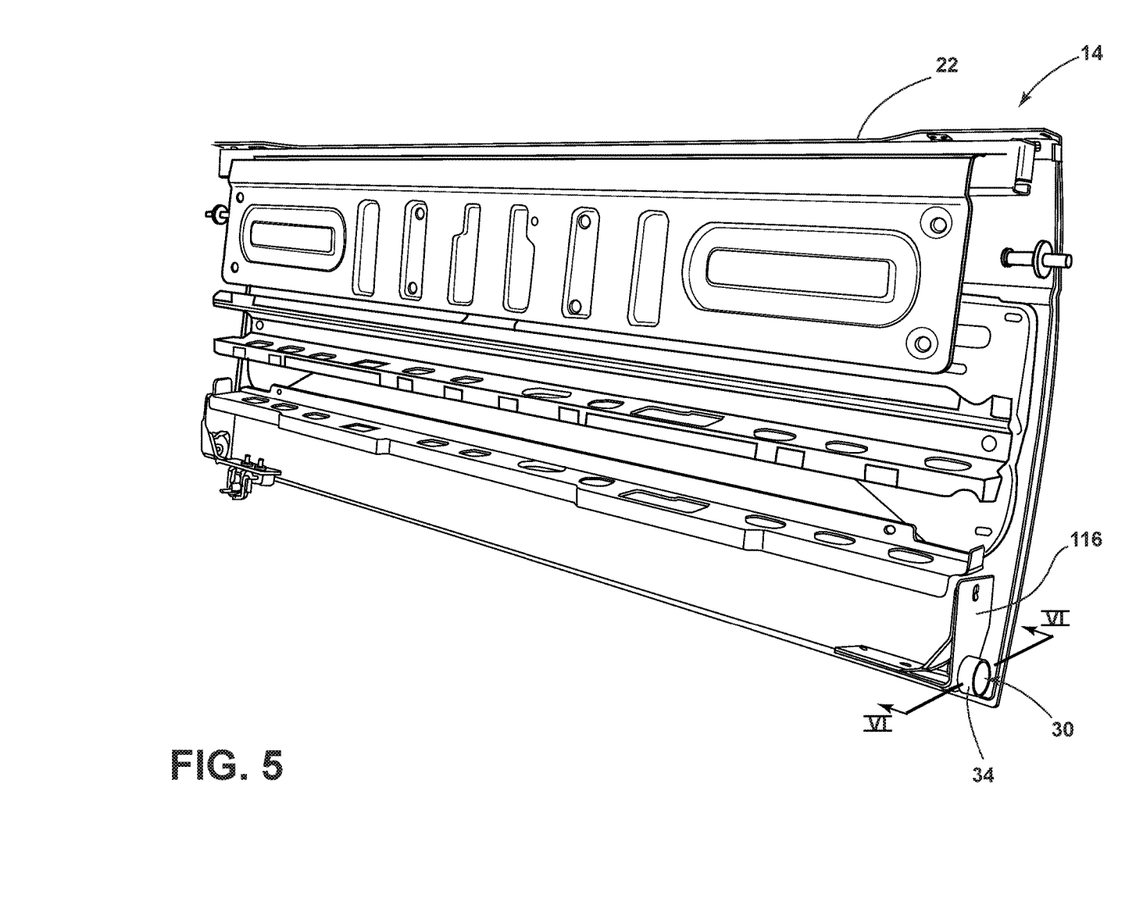
FIG. 5 is perspective view of a vehicle tailgate, according to one embodiment.
Figure 6:
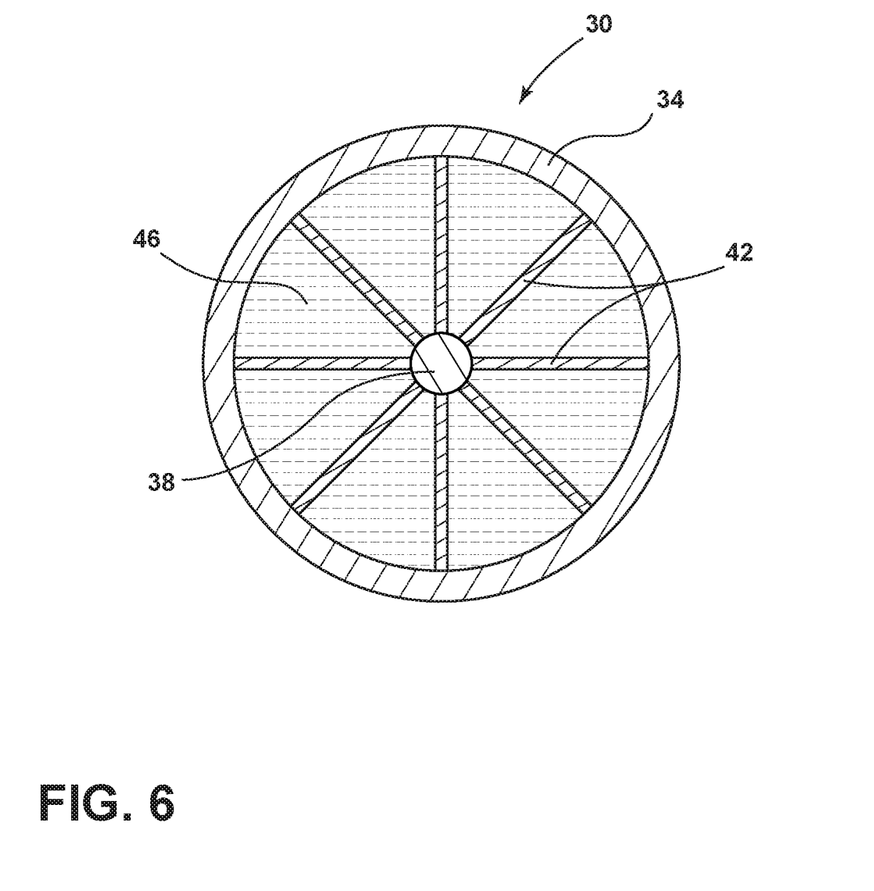
FIG. 6 is a cross-sectional view taken at line VI of FIG. 5, according to one embodiment.
Figure 7:
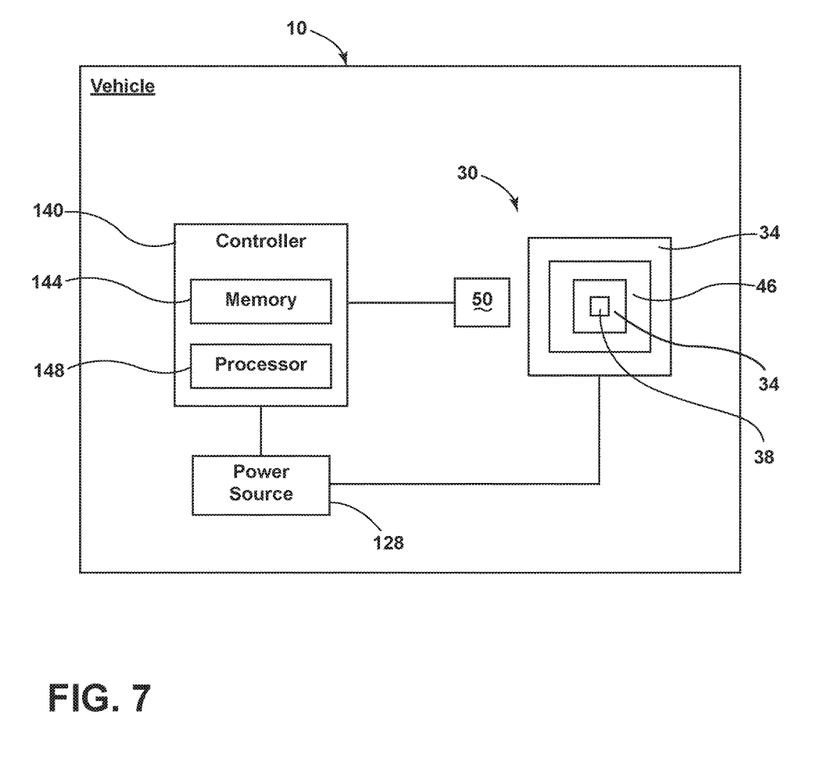
FIG. 7 is a box diagram of the vehicle, according to one example.

Referring now to FIG. 7, depicted is a box diagram of the vehicle 10 in which the hinge pivot 30 is implemented. The vehicle 10 includes a controller 140 in communication with the sensor 50 and the cylinder 34. The controller 140 may include a memory 144 having instructions (e.g., routines) contained therein that are executed by a processor 148 of the controller 140. The controller 140 may provide electrical power to the cylinder 34 via the power source 128 located onboard the vehicle 10. In addition, the controller 140 may be configured to control the magnetic field produced by the cylinder 34 based on feedback received from the sensor 50. The memory 144 may include a variety of routines configured to vary the intensity of magnetic field emitted by the cylinder 34 based on the detected movement of the vanes 42 and/or the tailgate 22. For example, the memory 144 may include one or more routines for controlling the speed of motion of the tailgate 22. In one example, the routines may provide electrical energy to the cylinder 34 when the tailgate 22 is detected as moving from the closed position to the open position (i.e., to increase the viscosity of the fluid 46 to dampen the motion of the tailgate 22). In another example, the routines may be configured to not provide electrical energy to the cylinder 34 if the tailgate 22 is moving from the open position to the closed position (i.e., to prevent resistance to an operator moving the tailgate 22 from the open position to the closed position). In another routine, detection of the tailgate 22 in the open position may prompt the cylinder 34 to increase the viscosity of the fluid 46 such that wobbling of the tailgate 22 may be prevented due to motion of the vehicle 10. In another example, the viscosity of the fluid 46 may not be increased until the tailgate 22 nearly reaches the open position. In another routine, the memory 144 may recall which position the tailgate 22 is in such that the sensor 50 may not need to determine the direction of motion, only that the vanes 42 and/or the tailgate 22 are moving to increase the viscosity of the fluid 46. In another routine, the memory may store that the tailgate 22 was moved to the open position, and not energize the cylinder 34 until the tailgate 22 has been latched in the closed position again.

Use of the present disclosure may offer a variety of advantages. First, use of the disclosed hinge pivots 30 allow for a dynamic control of the transition between the open and closed positions. Second, use of the sensor 50 allows for not only the detection of motion of the vane hub 38 and vanes 42, but also a detection of the direction of rotation of the vane hub 38 and vanes 42. Third, use of the hinge pivots 30 may allow for the elimination of torsion bars and/or other lift assist mechanisms. Elimination of the torsion bar may offer a weight and cost savings to the vehicle 10. Fourth, temperature of the environment around the vehicle 10 may not affect the ability of the hinge pivot 30 to control the speed of the tailgate 22.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. A vehicle tailgate assembly comprising:
a vehicle cargo box; and
a hinge pivot coupling a tailgate to the vehicle cargo box and comprising:
a vane hub positioned within an electromagnetic cylinder and coupled to the tailgate, wherein the vane hub is configured to rotate within the cylinder;
a controller configured to not provide electrical energy to the cylinder when the tailgate pivots to a closed position; and
a magnetorheological fluid positioned around the vane hub.

2. The tailgate assembly of claim 1, wherein the vane hub rotates as the tailgate pivots between closed and open positions.

3. The tailgate assembly of claim 1, wherein a plurality of vanes are coupled to the vane hub.

4. The tailgate assembly of claim 3, further comprising:
a sensor positioned proximate the hinge pivot and configured to detect motion of the plurality of vanes.

5. The tailgate assembly of claim 4, wherein the sensor is configured to detect a direction of motion of the plurality of vanes.

6. The tailgate assembly of claim 5, wherein the electromagnetic cylinder is an electromagnet.

7. The tailgate assembly of claim 6, wherein a power source is electrically coupled to the electromagnetic cylinder.

8. The tailgate assembly of claim 5, wherein the magnetorheological fluid changes viscosity in response to motion of the plurality of vanes.

9. A vehicle tailgate assembly comprising:
a hinge pivot coupled to a tailgate and comprising:
a plurality of vanes coupled to a vane hub positioned in an electromagnetic cylinder, wherein a controller is configured to not supply electrical energy to the cylinder as the tailgate pivots to a closes position; and
a magnetorheological fluid positioned around the vanes; and
a sensor positioned proximate the cylinder and configured to detect motion of the vanes relative to the cylinder.

10. The tailgate assembly of claim 9, wherein the cylinder rotates as the tailgate pivots between closed and open positions.

11. The tailgate assembly of claim 9, wherein the sensor is configured to detect a direction of motion of the vanes.

12. The tailgate assembly of claim 9, wherein the electromagnetic cylinder is an electromagnet.

13. The tailgate assembly of claim 9, wherein the magnetorheological fluid changes viscosity in response to motion of the vanes.

14. A vehicle tailgate assembly comprising:
a hinge pivot coupling a tailgate to a cargo box and comprising:
an electromagnetic cylinder;
a vane configured to rotate relative to the cylinder; and
a magnetorheological fluid positioned within the cylinder; and
a sensor positioned proximate the cylinder configured to detect motion of the vane and not energize the electromagnetic cylinder to generate a magnetic field within the magnetorheological fluid when the tailgate is pivoted to a closed position.

15. The tailgate assembly of claim 14, wherein the sensor is configured to detect a direction of motion of the vane.

16. The tailgate assembly of claim 15, further comprising:
a power source electrically coupled to the electromagnetic cylinder, wherein the power source is configured to provide electrical energy to the electromagnetic cylinder when the sensor detects motion of the vane.

17. The tailgate assembly of claim 16, wherein providing electrical energy to the electromagnetic cylinder generates the magnetic field within the cylinder.

18. The tailgate assembly of claim 17, wherein the cylinder rotates relative to the vane.

* * * * *

UNITED STATES PATENT AND TRADEMARK OFFICE
CERTIFICATE OF CORRECTION

PATENT NO. : 10,145,164 B2
APPLICATION NO. : 15/335531
DATED : December 4, 2018
INVENTOR(S) : Singh et al.

Page 1 of 1

It is certified that error appears in the above-identified patent and that said Letters Patent is hereby corrected as shown below:

In the Claims

Column 8:
Claim 9, Line 2:
"closes" should be --closed--

Signed and Sealed this
Twenty-sixth Day of February, 2019

Andrei Iancu
*Director of the United States Patent and Trademark Office*